Figure 1:
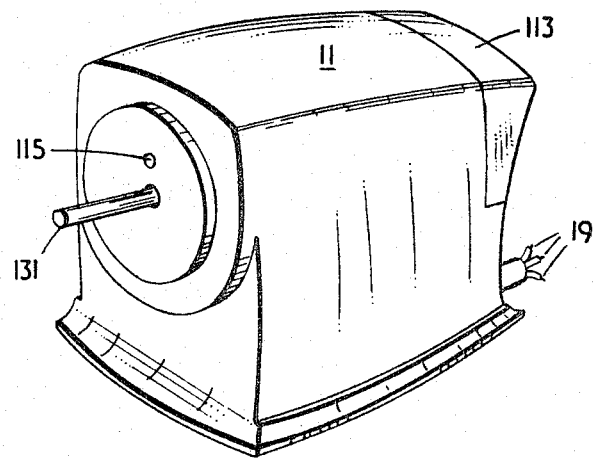

Sept. 27, 1966    R. KREN    3,275,862
SUBMERSIBLE ELECTRIC MOTOR FOR APPLIANCES
Filed April 24, 1963    2 Sheets-Sheet 1

Robert Kren
by Kenway, Jenney & Hildreth
Attys.

Sept. 27, 1966  R. KREN  3,275,862
SUBMERSIBLE ELECTRIC MOTOR FOR APPLIANCES
Filed April 24, 1963  2 Sheets-Sheet 2

United States Patent Office 3,275,862
Patented Sept. 27, 1966

3,275,862
SUBMERSIBLE ELECTRIC MOTOR FOR APPLIANCES
Robert Kren, Sutton Coldfield, England, assignor to James Beresford & Son Limited, Ace Works, Kitts Green, Birmingham, England, a corporation of the United Kingdom of Great Britain and Northern Ireland
Filed Apr. 24, 1963, Ser. No. 275,257
Claims priority, application Great Britain, Nov. 13, 1962, 42,782/62
3 Claims. (Cl. 310—87)

This invention has reference to submersible electric motors and has for its especial object to provide a submersible electric motor which can serve as a power source for a wide variety of duties and which is simple in construction, efficient in operation and capable of being produced at a relatively low cost.

Accordingly the invention consists of a submersible electric motor incorporating a stator section, an encasement for the stator section of a waterproof synthetic plastics material having good electrical insulating properties, good heat conductivity and strength and which is molded around the stator section so as to encase the stator section completely in a water-proof manner, a rotor, a metal liner which is bonded to the stator section in waterproof association therewith during the process of molding the encasement around the stator section and which liner serves to bound the chamber within which the rotor is required to work, bearings for the spindle of the rotor which are enclosed within the encasement, said encasement serving as the mounting means for the electric motor as a whole, a passage in one end portion of the encasement which is open at its outer end to the exterior of the encasement and which at its inner end opens into the hottest zone of the rotor chamber, a detachable section of the encasement which is made of the same material, means for securing the detachable section to the main body of the encasement to complete the encasement, the permissible separation of the detachable section from the main body of the encasement facilitating positioning of the rotor within the rotor chamber and permitting of the removal of and the replacement of the rotor as required, a passage in the said detachable section, the inner end of which is open to the rotor chamber at the opposite end of the rotor chamber to that first mentioned, and the outer end of which second mentioned passage opens to the exterior of the encasement whereby the liquid within which the electric motor may be immersed may flow through the said second mentioned passage into the rotor chamber and around the rotor as a coolant and subsequently pass out of the rotor chamber by way of the passage first mentioned and leads for conducting electric current to the windings of the stator section which are embedded in and bonded in the encasement during the molding process and which after embedment are permanently retained within the encasement.

The invention still further resides in a submersible electric motor constructed, arranged and adapted for use substantially as will be described hereinafter.

Figure 2:
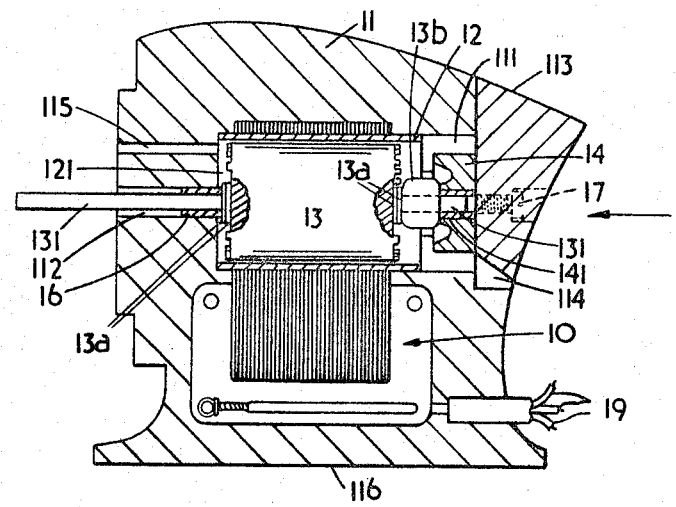
Figure 3:
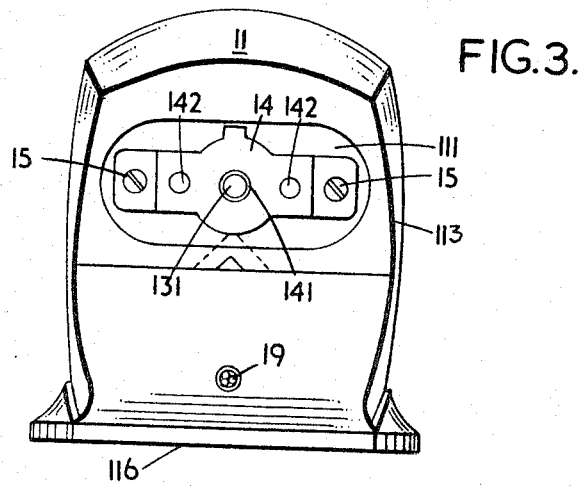

The invention will now be described with particular reference to the accompanying drawings wherein:

FIG. 1 is a perspective view of a submersible fractional horse power electric motor in accordance with the invention, FIG. 2 is a view partly in elevation but mainly in longitudinal vertical section of the submersible electric motor illustrated in FIG. 1, and FIG. 3 is an end view of the submersible electric motor illustrated in FIG. 2 looking in the direction of the arrow in the said figure with a detachable part of the encasement removed.

In the drawings, where applicable, like numerals of reference indicate similar or analogous parts in the several views.

According to the preferred manner of carrying the invention into effect, the stator section 10 of a fractional horse power electric motor of shaded pole squirrel cage type of a proprietary make, the construction and manner of operation of which is well known to those skilled in the art, is placed within a mold and encased by molding, in a manner which will be obvious to those skilled in the art, in a waterproof encasement 11 of an epoxy resin conveniently the resin known in commerce under the registered trademark Araldite.

Conveniently, during the molding of the encasement, there is bonded to the encasement 11 in waterproof association therewith a liner 12 of thin sheet stainless steel for defining and bounding the chamber 121 within which the rotor 13 is required to work.

The encasement 11 is provided at one end with a bearing bracket 14 within which is mounted a bearing bush 141 for the relevant end of the rotor spindle 131, the said bearing bracket 14 being located within a pocket 111 in the end of the encasement 11 and secured to the said encasement 11 by bolts 15 which are engaged within tapped inserts, not shown, molded in the encasement 11 in a manner well known in the molding of plastics.

At the opposite end of the encasement 11 there is provided an axially aligned hole 112 for the reception of a bearing bush 16 of composition material for serving as the bearing for the adjacent end portion of the rotor spindle 131.

The bearing bracket 14 aforesaid, is located within a gapped portion 111 of the encasement 11 which is adapted to be enclosed by a removable end cover 113, of similar material to the encasement 11, which serves as a continuation of the contour of the external surface of the main body of the encasement 11, the removable end cover 113 being bolted to the bearing bracket 14 by means of bolts 17 which are passed through holes in the said end cover 17 and the shanks thereof engaged within tapped holes 142 in the said bearing bracket 14.

The gapped portion 111 of the encasement 11 which is adapted to be closed by the removable end cover 113, serves to permit of the introduction of the rotor 13 into the rotor chamber 121 in the assembly of the motor and its removal, as required, subsequent to the removal of the said removal end cover 113.

The removable end cover 113 is provided with a passage 114 of varying triangular cross-section the narrower end of which opens externally of the said removable end cover 113, while the wider end is in communication with the adjacent end of the rotor chamber 121.

Formed in the body of the encasement 11, at the opposite end to that to which the removable end cover 113 aforesaid is fitted, is a second open ended passage 115 which is parallel to the axis of the rotor 13 and which leads from the upper region of the rotor chamber 121.

The passage 114 in the end cover 113, and the open ended passage 115 in the opposite end portion of the encasement in conjunction with the interior of the liner 12, provide a through passage so that liquid, in which the electric pump may be immersed for working purposes, may circulate continuously through the passageways 114, 115 and rotor chamber 121 as a coolant.

The open ended passageway 115 aforesaid, opens from the upper region of the rotor chamber 121, i.e. the interior of the liner 12, since this region is the region where most heat is generated.

Shims 13a may be interposed, where requisite, to permit a slight end float to the rotor spindle 131 where this is rendered desirable by the requirements of the particular usage for which an electric motor in accordance with the invention is intended, for example, in the cases where the electric motor is required to drive a pump or a tool. The shims 13a adjacent to the bearing bracket 14, cooperate with a bulbous combined distance piece and thrust washer 13b.

Shims 13a may be added also to compensate for any inaccuracies in manufacture.

Current leads 19 are embedded in and bonded in the encasement 11 during the molding process and are made of sufficient length so that connection can be made to power lines through the medium of electrical couplings in accordance with established practice.

The encasement 11 is provided with a flat under-surface 116 which may serve as a base on which the electric motor may be rested, and if desired the encasement may be molded with eyes for facilitating handling.

It will be appreciated that as the stator section 10 of an electric motor as hereinbefore described is completely encapsulated in a waterproof manner in an encasement of good heat conductivity, and since provision is made for circulating the liquid within which the motor is immersed into and through the rotor chamber 121 and out of the rotor chamber and around the rotor 13 as a coolant, dissipation of heat generated by the motor is enhanced, so that it is ensured that an electric motor of intermittent rating at a given load working in air may be used as an electric motor of continuous rating, at the same load, when submerged in water.

It will be further appreciated that as a shaded pole squirrel cage type of electric motor is probably the cheapest type of electric motor which can be produced on mass production lines an electric motor in accordance with the invention may be manufactured at a relatively low cost while retaining the simplicity of construction and efficiency of operation of this type of electric motor.

The combined unit is the subject matter of my co-pending application Serial No. 242,445, filed December 5, 1962.

Having thus disclosed my invention and described in detail an illustrative embodiment thereof I claim as new and desire to secure by Letters Patent:

1. A submersible electric motor incorporating a stator section, an encasement for the stator section of a waterproof synthetic plastics material having good electrical insulating properties, good heat conductivity and strength, and which is molded around the stator section so as to embed the stator section in the encasement completely in a waterproof manner, a rotor, a metal liner which is bonded to the stator section in waterproof association therewith during the process of molding the encasement around the stator section and which liner serves to bound the chamber within which the rotor is required to work, bearings for the spindle of the rotor which are enclosed within the encasement, said encasement having a flat under surface providing a base for supporting the electric motor as a whole, a passage in one end portion of the encasement which is open at its outer end to the exterior of the encasement and which at its inner end opens into the hottest zone of the rotor chamber, a detachable section of the encasement which is located at the opposite end portion of the encasement to the end portion first mentioned which is made of the same material, means for securing the detachable section to the main body of the encasement to complete the encasement, the permissible separation of the detachable section from the main body of the encasement facilitating positioning of the rotor within the rotor chamber and permitting of the removal of and the replacement of the rotor as required, a passage in the said detachable section the inner end of which is open to the rotor chamber at the opposite end of the rotor chamber to that first mentioned, and the outer end of which second mentioned passage opens to the exterior of the encasement whereby the liquid within which the electric motor may be immersed may flow through the said second mentioned passage into the rotor chamber and around the rotor as a coolant and subsequently pass out of the rotor chamber by way of the passage first mentioned which leads from the hottest zone of the rotor chamber and leads for conducting electric current to the windings of the stator section which are embedded in and bonded in the encasement during the molding process and which after embedment are permanently retained within the encasement.

2. A submersible electric motor as claimed in claim 1 in which the bearing for one end of the rotor spindle is carried by a separately formed bracket which is secured to the encasement and in which the bearing for the other end of the rotor spindle is constituted by a bearing inserted in an axial passage in the encasement.

3. A submersible electric motor as claimed in claim 1 the inlet for the coolant being constituted by a passageway formed in the detachable section of the encasement and in which the said passageway is of progressively increasing cross-sectional area with the greatest cross-sectional area at the place where the passageway opens to the presented end of the rotor chamber.

References Cited by the Examiner
UNITED STATES PATENTS

| | | | |
|---|---|---|---|
| 1,875,207 | 8/1932 | Apple | 310—43 |
| 1,954,704 | 4/1934 | Kraus | 239—23 |
| 2,548,133 | 4/1951 | Treat | 310—43 |
| 2,568,548 | 9/1951 | Howard et al. | 103—87 |
| 2,695,369 | 11/1954 | Lloyd et al. | 310—87 |
| 2,725,012 | 11/1955 | Zimsky | 103—87 |
| 2,782,720 | 2/1957 | Dochterman | 310—43 X |
| 2,846,599 | 8/1958 | McAdam | 310—43 X |
| 2,944,297 | 7/1960 | Maynard | 310—43 X |
| 2,974,871 | 3/1961 | Naythons | 239—17 |
| 3,002,261 | 10/1961 | Avila | 310—43 X |
| 3,072,810 | 1/1963 | Luenberger | 310—87 |
| 3,074,349 | 1/1963 | Zimmerman | 310—43 |
| 3,119,942 | 1/1964 | Luther | 310—50 |
| 3,135,885 | 6/1964 | Maynard | 310—43 X |
| 3,180,267 | 4/1965 | Bemmann | 310—43 |

MILTON O. HIRSHFIELD, *Primary Examiner.*

EVERETT W. KIRBY, ORIS L. RADER, *Examiners.*

D. L. MOSELEY, J. W. GIBBS, *Assistant Examiners.*